(12) United States Patent
Roberts

(10) Patent No.: US 9,194,361 B2
(45) Date of Patent: Nov. 24, 2015

(54) APPARATUS FOR GENERATING POWER FROM FLUID FLOW

(75) Inventor: Peter Roberts, Horsham (GB)

(73) Assignee: VERDERG LTD, Knaphill (GB)

( * ) Notice: Subject to any disclaimer, the term of this patent is extended or adjusted under 35 U.S.C. 154(b) by 553 days.

(21) Appl. No.: 13/634,675

(22) PCT Filed: Mar. 16, 2011

(86) PCT No.: PCT/GB2011/050523
§ 371 (c)(1),
(2), (4) Date: Nov. 21, 2012

(87) PCT Pub. No.: WO2011/114155
PCT Pub. Date: Sep. 22, 2011

(65) Prior Publication Data
US 2013/0099502 A1    Apr. 25, 2013

(30) Foreign Application Priority Data

Mar. 16, 2010 (GB) .................................. 1004321.4
Mar. 16, 2010 (GB) .................................. 1004347.9

(51) Int. Cl.
*F03B 17/06* (2006.01)
*F03B 13/08* (2006.01)
*F03B 13/26* (2006.01)

(52) U.S. Cl.
CPC ................ *F03B 17/06* (2013.01); *F03B 13/08* (2013.01); *F03B 13/264* (2013.01); *F03B 17/063* (2013.01); *F05B 2260/601* (2013.01); *Y02E 10/28* (2013.01); *Y02E 10/38* (2013.01)

(58) Field of Classification Search
CPC ........ F03B 13/08; F03B 13/264; F03B 17/06; F03B 17/063; F05B 2260/601; Y02E 10/28; Y02E 10/38
See application file for complete search history.

(56) References Cited

U.S. PATENT DOCUMENTS

| 2,376,536 A | 5/1945 | Gonzer |
| 4,179,886 A | 12/1979 | Tsubota |
| 4,208,873 A | 6/1980 | Foglia |
| 4,504,192 A | 3/1985 | Cyrus et al. |
| 4,960,363 A | 10/1990 | Bergstein |

(Continued)

FOREIGN PATENT DOCUMENTS

| CA | 1 144 381 | 4/1983 |
| CA | 2 366 043 A1 | 6/2003 |

(Continued)

*Primary Examiner* — Igor Kershteyn
(74) *Attorney, Agent, or Firm* — Seed IP Law Group PLLC

(57) ABSTRACT

An apparatus for generating electricity using water flow in a body of water comprises: an array of spaced apart elements. Each element defines an elongate flow passage and has an upstream side and an elongate downstream side, each element being provided with a series of holes spaced along its length and the downstream side extending and tapering away in the direction of flow. The elements are arranged side by side such that opposing walls of adjacent elements define a venturi section and a first diffuser section extending downstream from the venturi section. The apparatus also comprises:—a flow conduit having an inlet and an outlet;—a turbine located in the flow conduit;—and a generator connected to the turbine; The flow passages are connected to the outlet of the flow conduit such that the flow of water through the venturi sections causes water to be drawn through the flow conduit out via the holes the resulting flow driving the turbine.

30 Claims, 18 Drawing Sheets

(56) References Cited

U.S. PATENT DOCUMENTS

| | | | |
|---|---|---|---|
| 5,464,320 A | 11/1995 | Finney | |
| 5,709,419 A | 1/1998 | Roskey | |
| 5,977,649 A * | 11/1999 | Dahill | 415/2.1 |
| 6,239,506 B1 * | 5/2001 | Roskey | 290/55 |
| 6,368,059 B1 * | 4/2002 | Maines | 416/42 |
| 6,437,457 B2 | 8/2002 | Roskey | |
| 6,568,181 B1 * | 5/2003 | Hassard et al. | 60/398 |
| 6,864,597 B1 * | 3/2005 | Ricker | 290/55 |
| 6,967,413 B2 | 11/2005 | Atiya | |
| 8,446,031 B2 * | 5/2013 | Roberts | 290/54 |
| 2005/0017514 A1 | 1/2005 | Tocher | |
| 2005/0099011 A1 | 5/2005 | Rochester et al. | |
| 2005/0285407 A1 | 12/2005 | Davis et al. | |
| 2007/0040389 A1 | 2/2007 | Kelley | |
| 2008/0129254 A1 | 6/2008 | Frayne | |
| 2009/0155074 A1 | 6/2009 | Sankar | |
| 2009/0236858 A1 | 9/2009 | Johnson | |
| 2009/0302612 A1 | 12/2009 | Gartner | |
| 2010/0007152 A1 | 1/2010 | Roskey | |
| 2010/0201132 A1 | 8/2010 | Ivanovich | |
| 2010/0213720 A1 | 8/2010 | Bailey et al. | |
| 2010/0283251 A1 | 11/2010 | Reynolds | |
| 2010/0289268 A1 | 11/2010 | Schiller | |
| 2011/0049896 A1 | 3/2011 | Burger et al. | |

FOREIGN PATENT DOCUMENTS

| | | |
|---|---|---|
| DE | 38 13 958 A1 | 11/1989 |
| DE | 41 05 499 A1 | 8/1992 |
| DE | 10 2005 040 805 A1 | 3/2007 |
| EP | 0 931 931 A1 | 7/1999 |
| FR | 891 697 | 3/1944 |
| FR | 923 131 | 6/1947 |
| FR | 2 470 195 A1 | 5/1981 |
| FR | 2 497 877 A2 | 7/1982 |
| FR | 2 792 661 A1 | 10/2000 |
| GB | 1 381 295 | 1/1975 |
| GB | 2 001 396 A | 1/1979 |
| GB | 2 224 059 A | 4/1990 |
| GB | 2 415 748 A | 1/2006 |
| GB | 2443195 | 4/2008 |
| GB | 2463504 | 3/2010 |
| GB | 2478743 A | 9/2011 |
| JP | 2005-520985 A | 7/2005 |
| JP | 2009-545692 A | 12/2009 |
| RU | 2 198 318 C2 | 2/2003 |
| SU | 1204775 A | 1/1986 |
| WO | 98/12433 A1 | 3/1998 |
| WO | 0125629 A1 | 4/2001 |
| WO | 03/054385 A1 | 7/2003 |
| WO | 03/081029 A1 | 10/2003 |
| WO | 03/081030 A1 | 10/2003 |
| WO | 2005/017349 A1 | 2/2005 |
| WO | 2005/075818 A1 | 8/2005 |
| WO | 2006/055393 A2 | 5/2006 |
| WO | 2008/015047 A1 | 2/2008 |
| WO | 2008015047 A1 | 2/2008 |
| WO | 2009/009350 A2 | 1/2009 |
| WO | 2009/018666 A1 | 12/2009 |
| WO | 2010032026 A2 | 3/2010 |

* cited by examiner

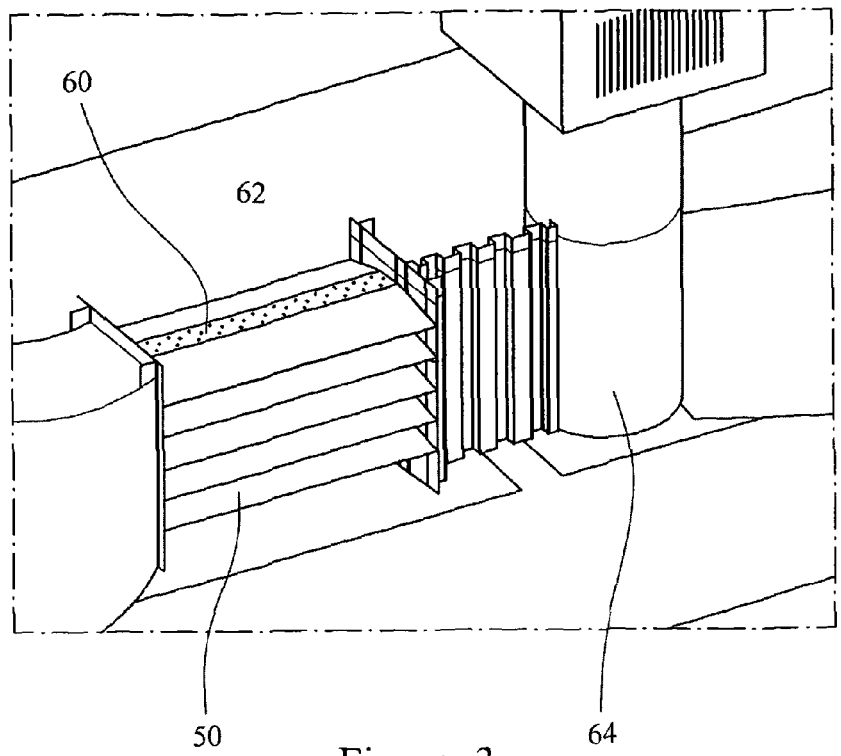
Figure 3
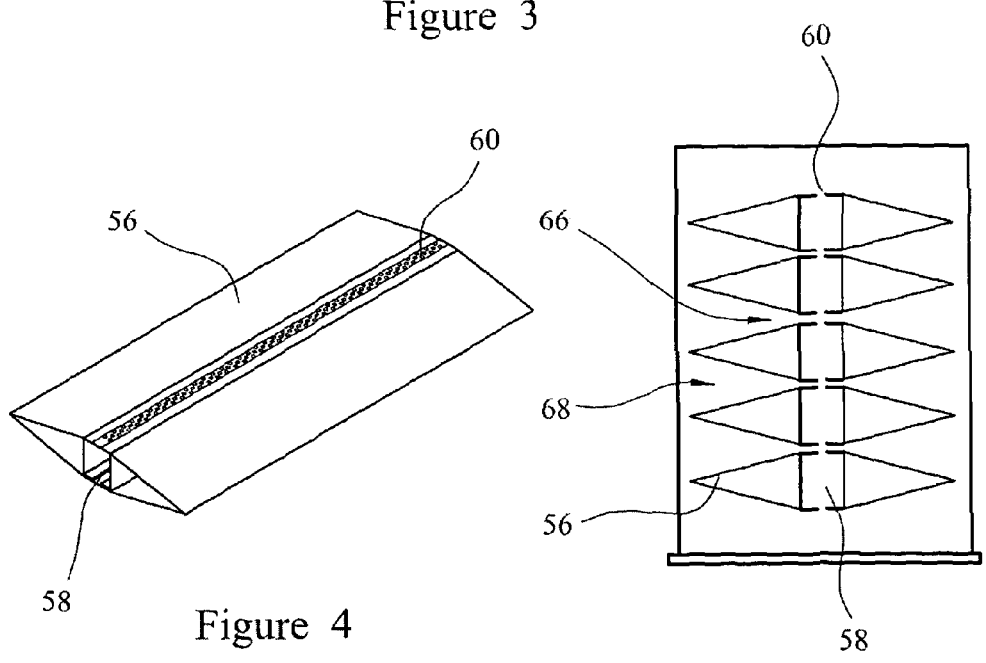
Figure 4
Figure 5

APPARATUS FOR GENERATING POWER FROM FLUID FLOW

BACKGROUND

1. Technical Field

This invention relates to a system for converting wave, tidal or current energy in a body of flowing water into a more useful form of energy. In particular this invention provides an apparatus for generating electricity using flows such as waves, tides or currents in a body of water.

2. Description of the Related Art

They have been a number of proposals for converting current, wave or tidal flows into electricity as a non-polluting approach to power generation.

Previous systems for extracting energy from waves used the vertical movement of the water surface caused by the phase shift between the elliptical water particle paths along a wavelength. Typically, previous devices involved some form of float coupled to a mechanical arrangement or some form of trapped air body above the wave surface for converting the periodic vertical movement of the wave surface into some form of motion useful for electricity generation (usually rotary). Such systems are often mechanically complicated and to work effectively are tuned to resonate at a frequency at which the energy density of the ambient wave spectrum is expected to peak. Output can drop dramatically if the wave frequency differs from this design resonant frequency. Such systems are useless if there is only lateral flow (current or tide) with no oscillating vertical wave component.

Systems have been proposed for extracting energy in lateral flows. Such systems have involved the use of a vane which can be caused to oscillate by the flow, a mechanical transmission system converting this into rotary motion. These systems face similar problems to wave-powered systems: mechanical complexity, inability to extract energy from other types of motion, etc. Other systems feature a large underwater propeller with an electrical power generator in the hub, analogous to a windmill but for water instead of wind flows. For the swept disc to gain exposure to the maximum incident current energy, the blades have to be very long which in turn requires sophisticated design and materials to accommodate the stresses at the blade root. Offshore tidal barrages seek to concentrate the incident energy of a large cross-section of water flow by trapping the tidal inflow on a rising tide behind a containing wall and funneling it out again through turbines of much smaller cross-sectional area, as in a conventional dam. The falling tide provides an adequate head difference between the trapped water in the lagoon behind the barrage and the falling tide on the seaward side of the barrage. Such barrages, typically across a tidal estuary, are very expensive and environmentally disruptive and require the interaction of the tidal flow with the local topography of the estuary to amplify the tidal range.

One common problem for wave or flow systems is their ability to address a sufficiently large cross-section of the ocean for power generation to be possible on an industrial scale. Furthermore, end or edge effects can make it easier for the flow to go around any structure positioned in the flow to extract energy from it rather than to pass through the energy extraction system. This problem can be lessened by making an installation very large but this in turn can lead to further complexity and expense and may lead beyond the limits of current engineering capability.

WO2008015047 discloses apparatus for converting energy from wave or current flows wherein a series of pipes are arranged such that venturis are defined between the pipes. Water flow between these pipes causes the venturis to act as pumps drawing water through the pipes which are fed by a manifolding flow conduit and driving a turbine. The series of pipes are arranged to form arrays with vertical planes which in turn are mounted on the sea bed to form barrages.

BRIEF SUMMARY

The invention seeks to provide alternative pipe arrangements to provide improved performances for such energy generating devices.

A first aspect of the invention provides an apparatus for generating electricity using water flow in a body of water comprising:

an array of spaced apart elements, each element defining an elongate flow passage having an upstream side and an elongate downstream side, each element being provided with a series of holes spaced along at least part of its length and the downstream side extending and tapering away from the upstream side, wherein the elements are arranged side by side such that opposing walls of adjacent elements define a venturi section and a first diffuser section extending downstream from the venturi section;

a flow conduit having an inlet and an outlet;

a turbine located in the flow conduit; and a generator or hydraulic pump connected to the turbine;

wherein the flow passages are connected to the outlet of the flow conduit such that the flow of water through the venturi sections causes water to be drawn through the flow conduit out via the holes with the resulting flow driving the turbine.

The upstream end of each element can extend and taper away from the holes to form an elongate shape such that when the elements are arranged side by side opposing walls of adjacent elements define a second diffuser section extending upstream from the venturi section. The profile of the upstream side and the downstream side can be substantially the same.

In one embodiment the profile of the front end of the upstream side is substantially V-shaped. With a V shaped front end on the upstream side a larger pressure drop in the venturi may occur. A larger pressure drop will help facilitate the secondary flow out up the holes to join the primary flow through the venturi.

The profiles of each element may be substantially hexagonal or substantially elliptical. The profiles are such that in use the profile of each element extends in the direction of fluid flow.

In one embodiment the profile of the upstream side and the profile of the downstream side are substantially different.

The outer surface of the elements defining the diffuser section can be roughened to induce turbulence in the diffuser section.

The apparatus can further comprise spacer elements located within the diffuser section. The spacer elements can be moveable within the diffuser section relative to the elements.

The apparatus is a 'Spectral Marine Energy Convertor' (SMEC).

The back end of the downstream end of the elements can comprise a plurality of perforations in order to assist boundary layer control at the diffuser section The downstream end can comprise a flow control valve, the flow control valve providing a flow path between the downstream end of the element and the flow passage.

Each element can comprise a moveable separation panel to separate the upstream side from the downstream side. The separation panel can be controllable to change the cross sectional area of the flow passage. Other mechanism to control the cross sectional area and/or block parts of the flow passage can be used The system may comprise a buoyancy means in order to control or vary the buoyancy of the system and for example to raise or lower its depth in the water. The buoyancy means may be provided in a section of the system and may be provided at the downstream side. The buoyancy means may be an airtight chamber into which air may be introduced or removed.

In one embodiment the elements are substantially vertical. The elements are connected to a horizontal manifold at their lower end; the manifold being connected to the flow conduit.

The apparatus can further comprise horizontal flow management vanes arranged horizontally across the elements. Each flow passage can comprise a series of chambers positioned vertically down the flow passage; and a feeder tube extending from each chamber and having an inlet located below the series of chambers.

In an embodiment having vertical elements, the apparatus can further comprise at least one horizontal septum extending between adjacent elements. A plurality of horizontal septums can extend between two adjacent elements at spaced apart intervals along the length of the elements. The horizontal septums may help minimize the size of vortexes in the vertical plane between adjacent elements.

In another embodiment the elements are substantially horizontal. The elements are connected to a vertical manifold; the manifold being connected to the flow conduit.

Each manifold can comprise a series of chambers, each chamber positioned adjacent the end of a flow passage; and a feeder tube extending from the chamber and having an inlet located below the series of chambers.

In an embodiment having horizontal elements the apparatus can further comprise at least one vertical septum extending between adjacent elements. A plurality of vertical septums can extend between two adjacent elements. The vertical septums may help minimize the size of vortexes in the horizontal plane between adjacent elements.

The apparatus can further comprise a syphonic cowl extending out from the downstream side of the apparatus. The syphonic cowl creates a sloping hood at the back of the apparatus which may help minimize turbulence from the mixing of flows exiting the venturis. The cowl may help maintain the pressure at the top of the apparatus on the downstream side below atmospheric pressure.

The holes may comprise a closure mechanism operable between an open position and a closed position such that when the mechanism is in the closed position water is prevented from flowing through the holes.

Each hole may have an individually controllable closure mechanism. The closure mechanism may be a valve and/or a gate. Each hole can be opened and closed individually or the closure mechanism can be centrally operated to close all holes in each array at one time. The presence of the closure mechanism enables the user to vary the cross sectional area of active part of the apparatus.

The length of the elements used, and the size of the apparatus may be varied and will depend upon factors such the range of depth the apparatus is to be used over, the desired use, the orientation of the elements, the depth of water concerned and the current flow within the water. The apparatus may extend over a range of tens of meters to several hundreds of meters and can depend on the width of the body water the system is to be installed in.

The apparatus can be constructed from any suitable materials. Materials can include mild steel, stainless steel, glass reinforced plastic, polycarbonate, concrete and/or plywood on various different real. Other high alloy steels and metals can also be used where appropriate.

A second aspect of the invention comprises an element for inclusion in an apparatus according to the first aspect of the invention for generating electricity using fluid flow in a body of water; the element defining an elongate flow passage and having an upstream side and a downstream side, the element being provided with a series of holes spaced along its length, the downstream side extending and tapering in the direction of flow, such that when elements are placed side by side in an array opposing walls of adjacent elements define a venturi section and a diffuser section extending downstream from the venturi section.

A third aspect of the invention comprises a method for generating electricity from water flow comprising the use of the apparatus according to the first aspect of the invention, the method comprising providing the apparatus in a flow of water; permitting a tidal or current flow to flow through the venturi, and permitting a secondary flow to flow through the flow conduit and drive the turbine.

BRIEF DESCRIPTION OF THE SEVERAL VIEWS OF THE DRAWINGS

The invention will now be described by way of example with reference to the accompanying drawings:

FIG. 3 shows an embodiment of the invention having horizontally arranged pipes;

FIG. 4 shows details of a horizontal pipe for use with the invention;

FIG. 5 shows a cross sectional side view of an embodiment of the invention having horizontally arranged pipes

DETAILED DESCRIPTION

The invention is broadly based on the technology disclosed in WO2008/015047, which describes an apparatus comprising an arrangement of first and second pipes for generating electricity using tidal, wave or current flow in a body of water. The first pipes are provided with a series of holes spaced along its length and are connected to a flow conduit having an inlet into the body of water. The venturis defined between adjacent pipes acts as venturi pumps inducing flow from inside the first pipes through the holes so as to draw water through the flow conduit and drive a turbine connected to a generator.

The term SMEC is used to define such technology. The word "spectral" signifies that energy is extracted from any water movement between the pipes irrespective of the frequency at which the ambient wave spectrum is expected to peak. SMEC is "pan-spectral". It works well even at near-zero frequency, i.e., in tidal flows and unidirectional (river) flows.

Figure 1:
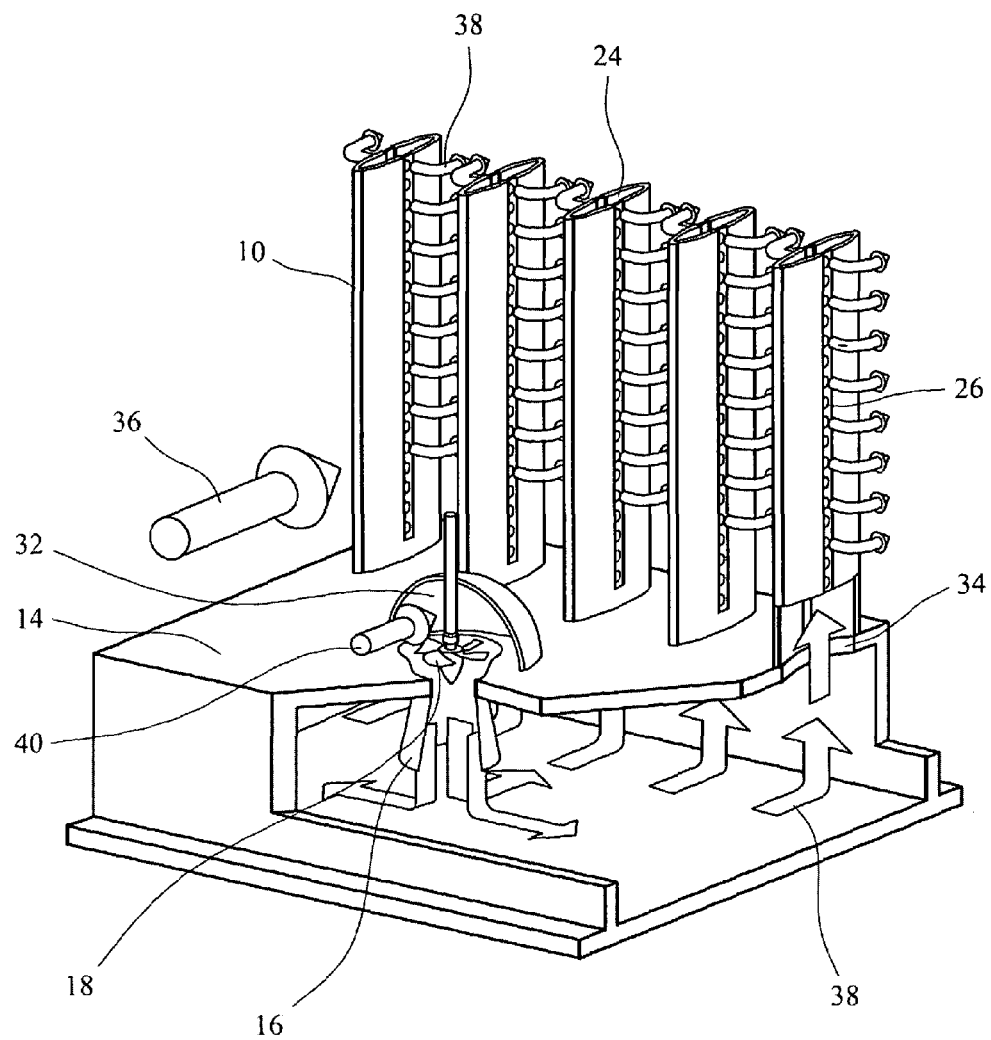
FIG. 1 shows an embodiment of the apparatus according to the invention aligned across a current flow.
Figure 2:
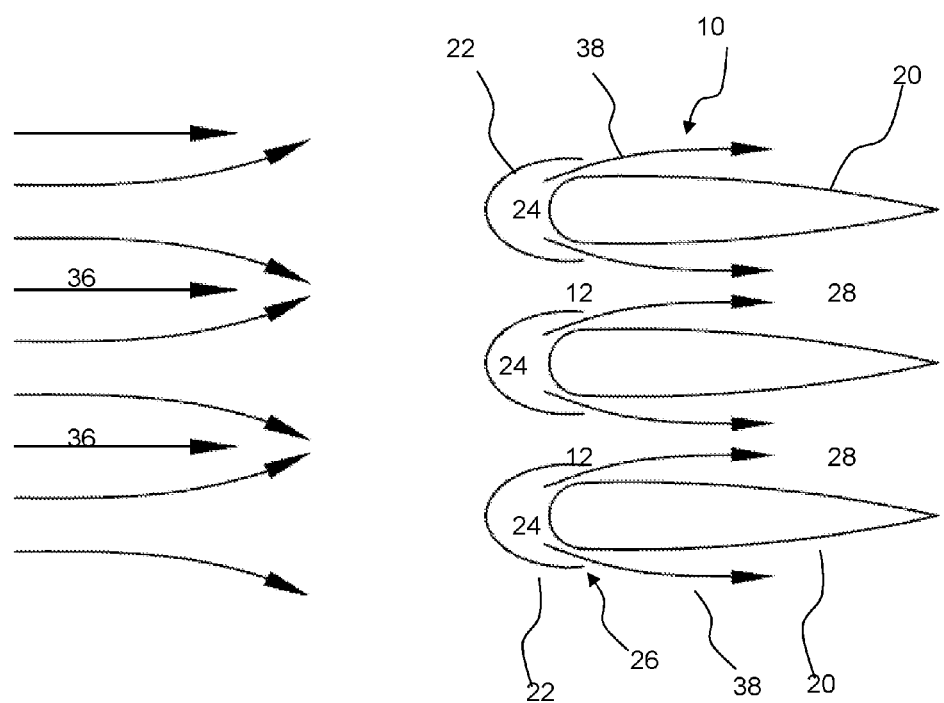
FIG. 2 shows a schematic plan view of an arrangement of pipes according to the invention across a current flow.

The basic principle of the invention is to provide an SMEC apparatus wherein the pipes have at least one tapered side such that a diffuser section is formed between adjacent pipes. FIG. 1 shows part of an apparatus comprising a series of pipes set across a current flow. FIG. 2 shows a plan view of a pipe arrangement to demonstrate the principle of operation.

The arrangement comprises an array of pipes 10 arranged vertically in a parallel spaced side-by-side arrangement in essentially the same plane with a venturi 12 defined between adjacent pipes. The lower ends of the pipes are connected to a common horizontal manifold structure 14 which is connected to the flow conduit 16 housing the turbine 18. The turbine 18 is connected to the generator via a drive shaft. Each pipe 10 comprises a downstream tapered side 20, and upstream side 22, a flow passage 24 and rows of holes 26 spaced along the length of the pipe. Adjacent pipes 10 are positioned such that a venturi section 12 and a diffuser section 28 are defined by the opposing walls of adjacent pipes 10. The holes 26 are positioned such that they are in fluid communication with the flow passage 24 and located at or near the venturi section 12.

Water enters the flow conduit 16 via the inlet 32 and the pipes 10 are connected to the outlets 34 of the flow conduit such that a primary flow 36 of water past the arrangement of pipes causes the venturi 12 to act as venturi pumps inducing flow 38 from inside of the pipes out through the holes 26 so as to draw water 40 through the flow conduit and drive the turbine. A head drop from the upstream water surface head to the downstream water level is caused by the venturi effect. As the current flows through the venturi between the pipes an amplified head loss occurs in the venturi. This induces the flow 38 of water out through the holes 26. This amplified head drop across the pipes, flow conduit and turbine induces a high velocity secondary flow 38 through the manifold piping with a volume smaller than the primary flow which can be used to drive the turbine.

FIG. 3 shows a different arrangement of pipes 50 for the SMEC apparatus, which is installed across an entrance of a body of water 62. In this embodiment the pipes 50 of the apparatus are arranged substantially horizontally having a substantially vertical plane and connected to a vertical manifold 64. The horizontal pipes 50 are arranged in a parallel spaced apart side-by-side array in essentially the same plane such that the opposing walls of adjacent pipes define a venturi and a diffuser section.

With reference to FIGS. 4 and 5 each pipe 50 comprises a tapered side 56, a flow passage 58 and holes 60 spaced along the length of the pipe 50. Adjacent pipes 50 are positioned such that a venturi section 66 and a diffuser section 68 are defined between the opposing walls of adjacent pipes. Water 62 enters the flow conduit via the inlet and the pipes 50 are connected to the outlets of the manifold 64 such that flow of water past the arrangement of pipes causes the venturi to act as venturi pumps inducing flow from inside the pipes through the holes so as to draw water through the flow conduit and drive the turbine.

A horizontal arrangement of venturi pipes can help isolate the induced low pressure in the venturi from the free surface of the primary flow. This helps maintain the low pressure formed in the venturi, which drives the secondary flow and thereby helps maintain the potential useful power output that can be achieved.

Energy losses through the venturi can occur as a result of reintegration of the secondary flow with the primary flow inside the venturi. The theoretical maximum amount of useful work that can be extracted from the secondary flow is a function of the geometry of SMEC apparatus. The geometry of the profile of the venturi can affect the energy losses in the venturi.

FIGS. 6-11 show examples of profiles of the pipes that can be used for forming the apparatus for use in unidirectional flows.

Each pipe 70 forming the array comprises an upstream side 72 and a downstream side 74. A flow passage 76 is positioned between the upstream side 72 and the downstream side 74. A series of holes or slots 78 are defined along the length of the flow passage 76 positioned so that they will be at or near the venturi section 80 formed between adjacent pipes. The holes or slots 78 are located at the position of the pipe having the greatest breadth and spaced apart along the length of the pipe. In pipes 76 for use in unidirectional flow 82 the profile of the upstream and downstream sides of the pipes can be different with the entrance 84 to the venturi 80 being shorter than the diffuser section 86 downstream of the venturi 80.

Figure 6:
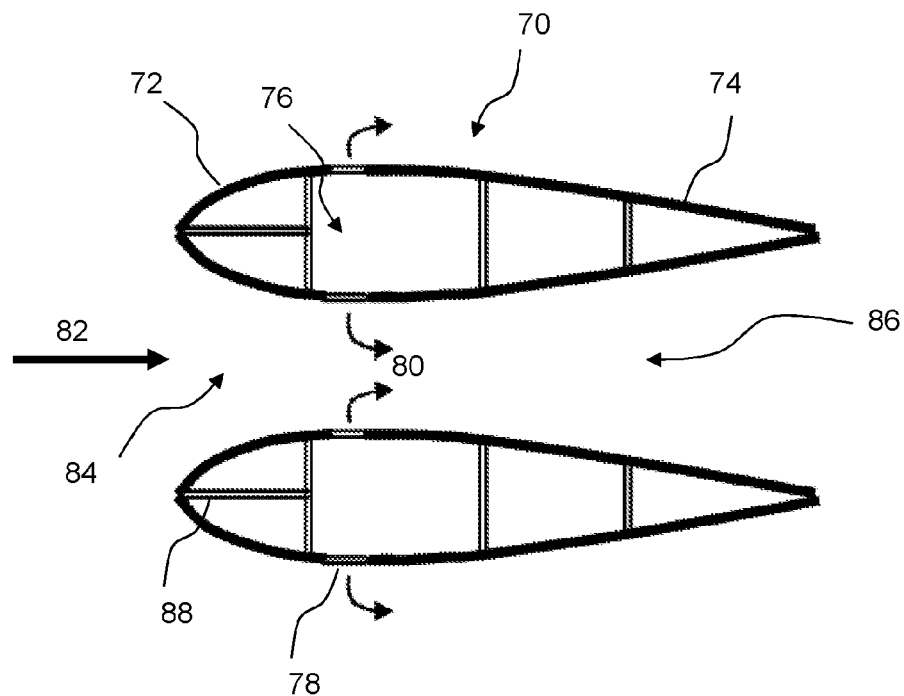
FIG. 6-11 shows examples of transverse cross sections of pipes for use in the apparatus of the invention.

The number, shape and arrangement of holes defined along the length of the flow passage can vary. The term holes can include apertures, slots, continuous slots, elongate holes and any other suitable opening into the flow passage FIG. 6 shows one profile of a venturi pipe 70 for use in the apparatus. The hollow venturi pipe 70 comprises a short substantially semicircular upstream side 72 tapering to an elongate downstream side 74 forming a substantially teardrop shape. A flow passage 76 forming part of the secondary flow path extends along the length of the pipe 70. Holes 78 are located between the upstream 72 and downstream 74 sides along the length of the pipe 70. The pipe 70 can be strengthened with the addition of internal bracing struts 88.

Figure 7:
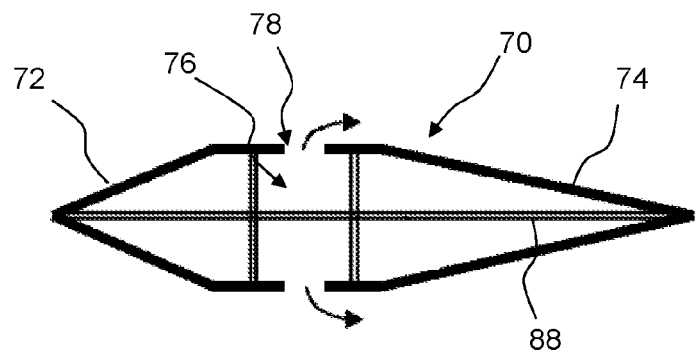

FIG. 7 shows a profile for a venturi pipe for unidirectional flow. The hollow venturi pipe 70 has a substantially hexagonal cross sectional shape having a short pointed upstream side 72 and an elongate downstream side 74 with a flow passage 76 extending along the length of the pipe 70. Holes 78 are located between the upstream and downstream sides along the length of the pipe.

Figure 8:
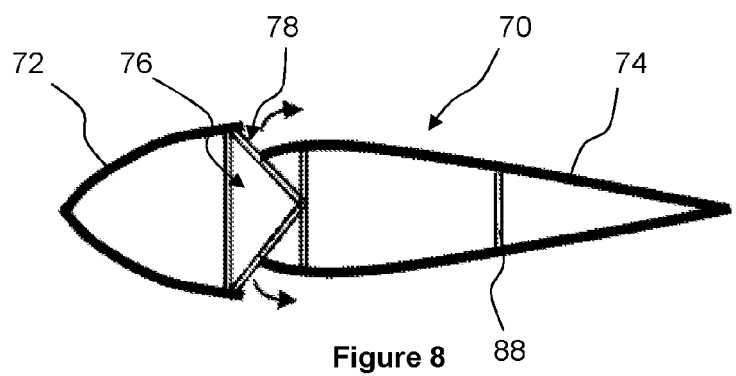
Figure 9:
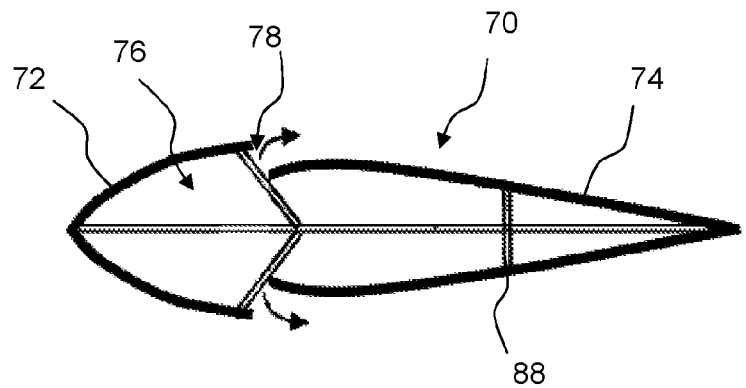

FIGS. 8 and 9 shows transverse cross sectional shapes of venturi pipes having a hollow center with differing arrangement of struts and bracing 88. The pipes 70 have a tapering elongate downstream side 74 and a shorter semicircular upstream side 72. The semicircular upstream side 72 has a wider diameter than the downstream side 74. Holes 78 are located along the length of the pipe 70 on the upstream side 72 at the boundary with the downstream side 74.

Figure 10:
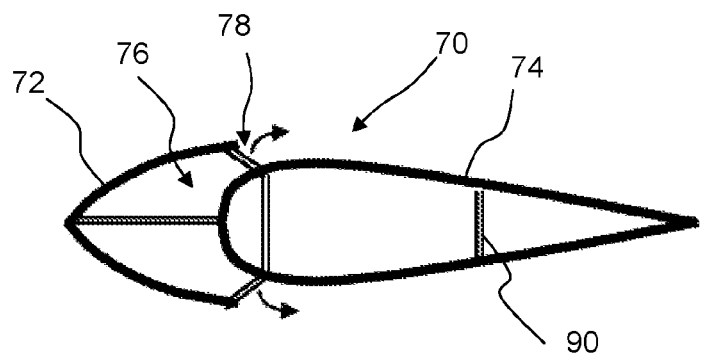
Figure 11:
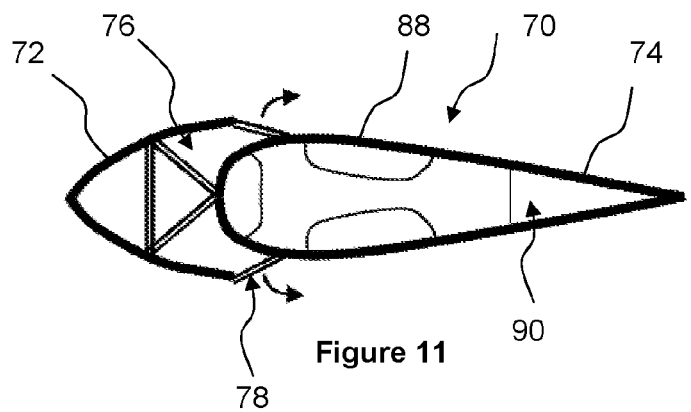

FIGS. 10 and 11 show different embodiments of the pipes for the apparatus having differing bracings, struts and plate arrangements to provide strengthening to the pipes. The cross section shape of the pipe 70 has a short tapering convex upstream side 72 forming the flow passage 76 for the secondary flow path. The pipe 70 has a tapered elongated downstream side 74 which is longer than the upstream side 72 and closed off from the upstream side 72. Holes 78 are located along the length of the pipe 70 in the upstream side 72 near the boundary with the downstream side 74 for secondary flow from the flow passage 76 into the venturi. The closed off downstream side 74 can include a buoyancy section 90.

The primary flow 82 accelerates into the venturi 80 between the pipes 70, flows through the venturi section 80 and then diverges out between the walls of the pipes that defines the diffuser section 86.

Providing a tapered section on the downstream side of the pipes helps aid pressure recovery as the primary flow decelerates out of the venturi. For optimal functioning of the venturi pump the low pressure regime is required to be preserved inside the venturi section in accordance with Bernoulli's theorem. In order to meet this requirement the primary flow needs to decelerate smoothly through the diffuser section lying downstream of the venturi section to give pressure recovery back up towards the ambient free stream head.

A blunter shorter upstream side to the pipe can be used in unidirectional flow with the positive pressure gradient in the entry throat of the venturi promoting good flow conditioning.

Figure 12:
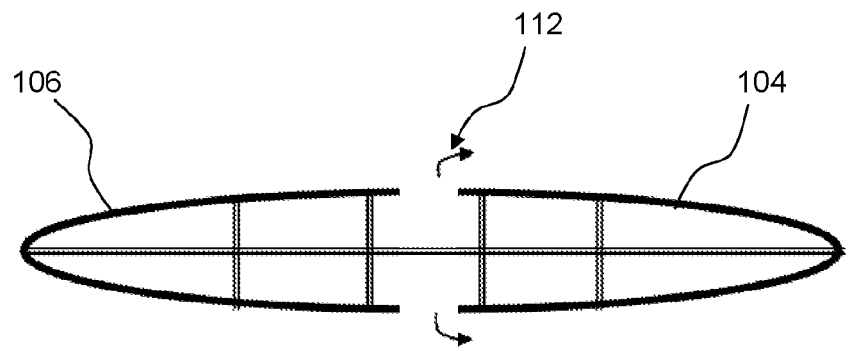
FIGS. 12-16 are examples of transverse cross sections of pipes for use in the apparatus of the invention.
Figure 13:
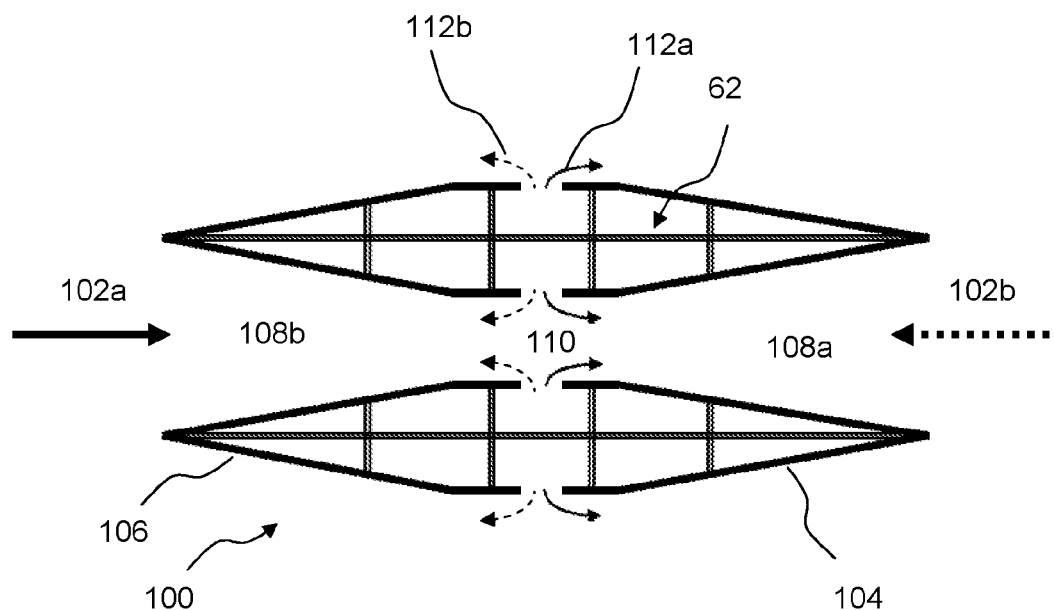
Figure 14:
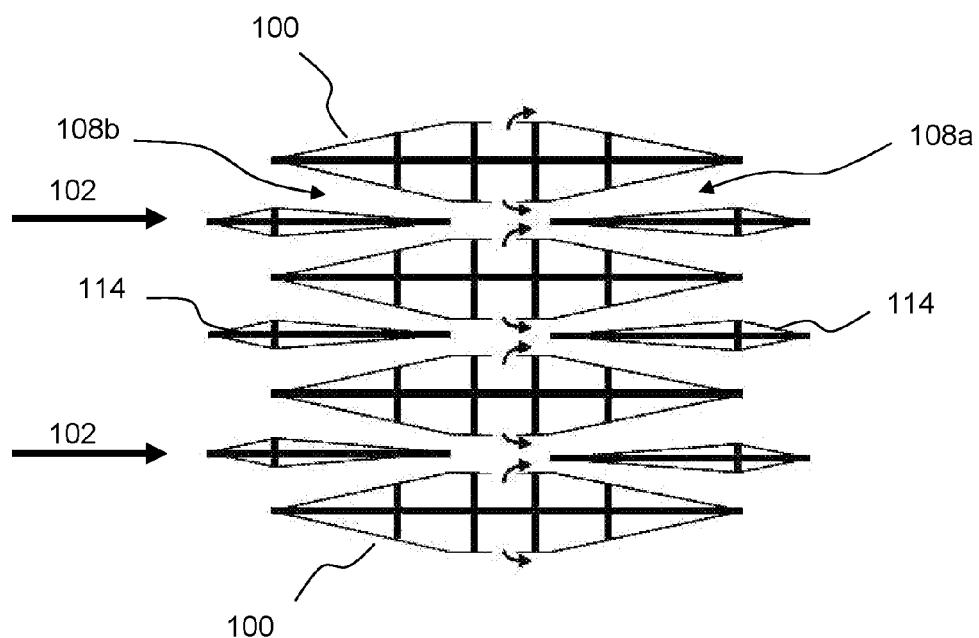

When the apparatus is to be used in bodies of water having bi-directional flow the pipe can have a substantially the same profile shape as shown in FIGS. 12, 13 and 14.

Pipes 100 for use in bi-directional flow 102a, 102b have a tapered downstream side 104 and upstream side 106, such that two diffusers sections 108a, 108b are defined between adjacent pipes 100 separated by the venturi section 110. The symmetrical shape of the pipes allows the entrance throat 108b of the venturi 110 to become the diffuser section when the direction of flow 102a is reversed 102b. The secondary flow 112a, 112b will join the primary flow 102a, 102b as it leaves the pipes 100 through the holes. As shown in FIG. 12 the bi-directional pipes 100 can have a substantially elliptical shape extending parallel to the direction of the water flow 102. Further examples of cross section shapes for pipes for use in bi-directional flow are shown in FIG. 13, the bi-directional pipes 100 can have a substantially hexagonal shape extending parallel to the direction of the water flow 102.

In order to achieve a low diffuser angle a pipe with a long chord length is obtained. FIG. 14 shows an array of bi-directional pipes 100 with spacers elements 114 located within the diffuser sections 108a, 108b formed by adjacent pipes 100. Spacer elements 114 can be positioned within the diffuser section to allow a short chord length over the whole assembly to be used whilst still preserving a small effective angle to aid pressure recovery. The change in the direction of the primary flow 102 as it passes through the diffuser section 108a with the spacer elements 114 promotes flow mixing and aids pressure recovery.

Figure 15:
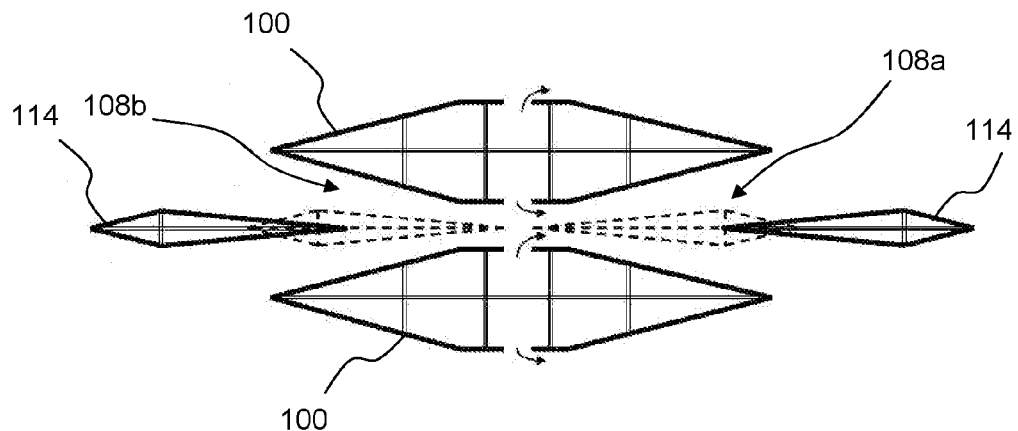

With reference to FIG. 15 the spacers 114 can be moveable in and out of the diffuser sections 108a, 108b. Movement of the spacers 114 changes the blockage ratio which can help performance in a tidal flow where the primary flow velocity is continuously variable. Movement of the spacers from a position close to the venturi section to a position further downstream decreases the blockage ratio.

Figure 16:
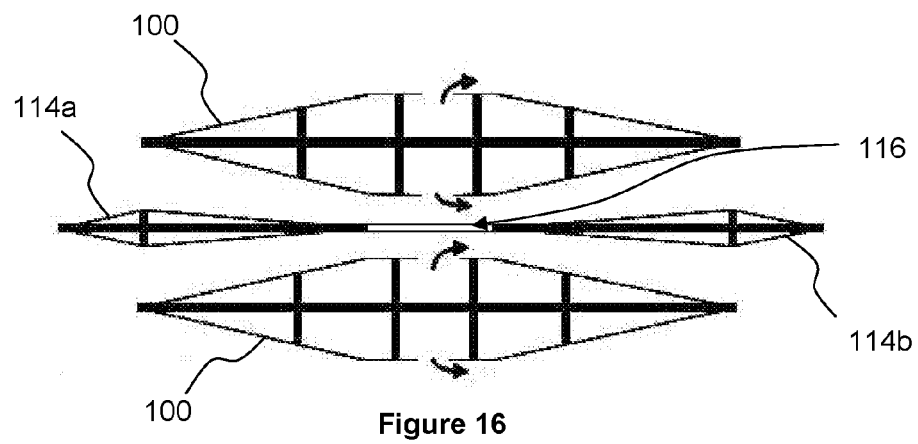

Further changes can be made to the SMEC apparatus to improve flow conditioning to obtain the appropriate flow profile. In one embodiment as shown in FIG. 16 the spacers 114a, 114b can be connected by a septum 116 within the venturi section. This can help prevent flow dividing around the spacer unevenly and can help flow conditioning.

The blockage ratio can influence the performance of the apparatus. The blockage ratio is formed by dividing the distance between the centerlines of two adjacent venturi pipes by the gap between adjacent pipes at the venturi section.

The outer surface of the pipes that defines the diffuser section can comprise a roughened area. The roughened surface helps to promote turbulent flow in the boundary layer which can promote mixing and aid pressure recovery. The surface can have an unsmooth surface, such as a dimpled surface. The surface may be formed onto the pipe during its manufacture or can be allowed to develop on the pipe during use by allowing natural accretion of marine growth or similar over time.

Figure 17:
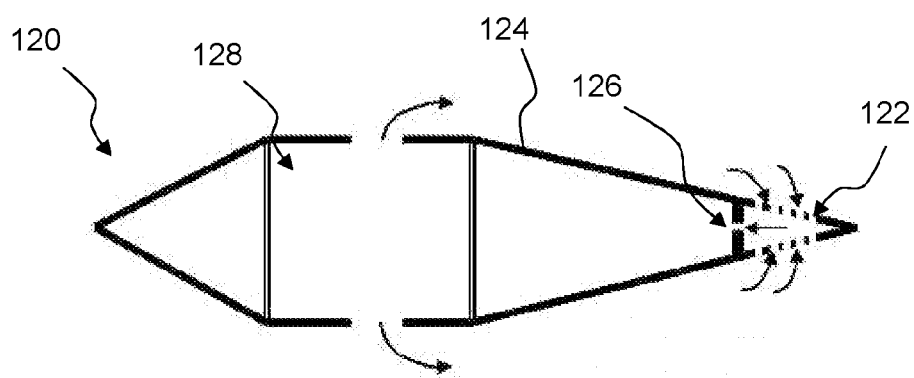
FIG. 17 shows a schematic transverse cross section of a pipe for use in an embodiment of the invention.

FIG. 17 shows a profile of a pipe 120 for use in a SMEC apparatus comprising perforations 122 in the trailing edge of the downstream side 124. Perforations 122 can be formed in the end of the downstream side 124 of the pipes and a flow control valve 126 can be located within the downstream side 124 to control flow of water from the boundary layer of the diffuser section into the flow passage 128. The flow control valve 126 can be used to draw water from the boundary layer of the diffuser section into the pipe 120 helping prevent or delay flow separation.

Figure 18:
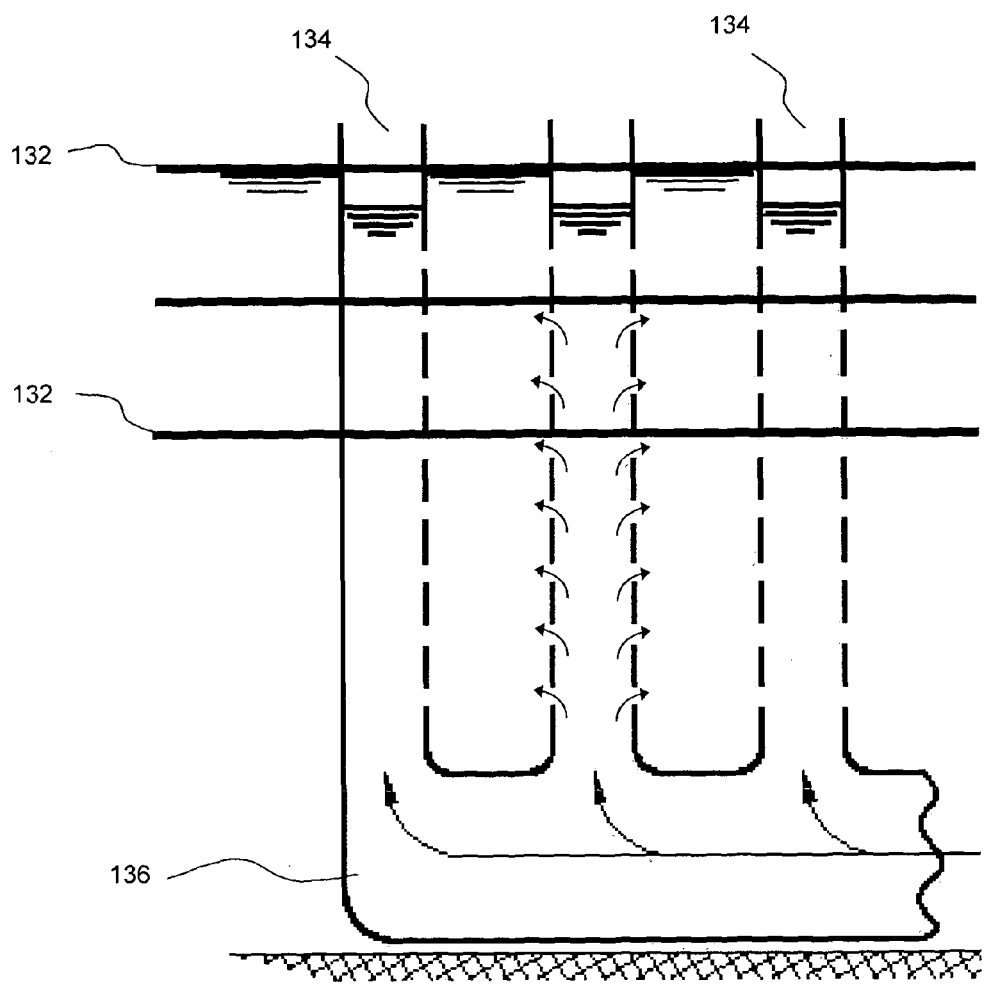
FIG. 18 shows a schematic of an embodiment of the invention having horizontal vanes.

FIG. 18 shows an embodiment of the invention having flow management vanes 132 extending horizontally across the vertically arranged pipes 134 connected to a manifold 136. The apparatus comprises an array of vertical pipes 134 with one or more flow management vanes 132 positioned horizontally across the vertically arranged array of pipes. The horizontal vanes can be flat to keep the flow substantially horizontal as it passes through the venturi.

The water surface at the top of each venturi gap is at the free surface of a water column that has accelerated forward up to a high velocity over the short length of the venturi prior to a deceleration as it exits into the diffuser section. The elevation of the free water surface is dictated by the complex force balance resulting from its total head, the rate of change of its momentum and the atmospheric pressure acting on it. The free water surface elevation remains at a higher elevation than its locally reduced total head would indicate were it quasi-static. Any tendency for the free surface to depress in the pipe can have a detrimental effect on the performance of the device. By positioning management vanes across the pipes depression of the free surface can be inhibited.

When the pipes themselves are horizontal such as shown in FIG. 3 the horizontal arrangement of the pipes inherently provides the same effect to the apparatus as horizontal management vanes can provide to vertical pipe arrangements.

Figure 19:
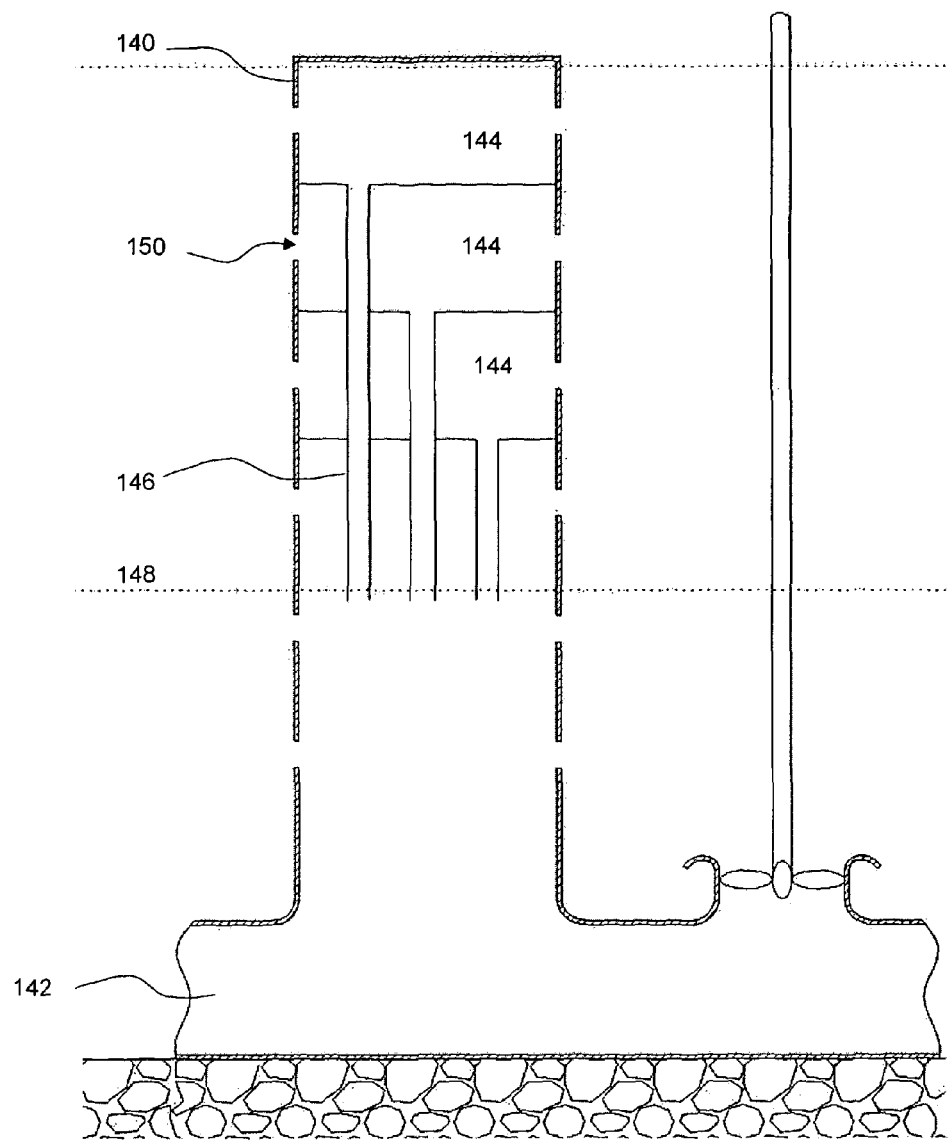
FIG. 19 shows a schematic of an embodiment of the invention having vertically arranged pipes with internal segmentation.

In situations where the apparatus is located in a tidal flow, the free surface of the primary flow water can have a variable elevation. FIG. 19 shows a cross section view of a part of an apparatus having vertical pipes 140 connected to a horizontal manifold 142. In a further embodiment of the invention each pipe 140 is divided into a plurality of chambers 144 arranged vertically along the length of the pipe. A feeder tube 146 is connected to each chamber 144 and extends to below the minimum free surface level 148 that the free surface of the secondary flow water will reach. The number of chambers required will depend on the variation in water level that the pipes are exposed to, the length of the pipes and the frequency of the holes 150 in the pipes.

In tidal flows as the water level falls the uppermost holes can become exposed to the atmosphere which exposes the water inside the pipes to atmospheric pressure. The water level inside the venturi pipes will then fall and less power can be generated since fewer holes along the pipe are active. Internal segmentation of the pipes to create a series of chambers each in fluid communication with the lower end of the pipe via a tube, enables all the holes below the primary flow surface to be utilized even at low water levels.

Figure 20:
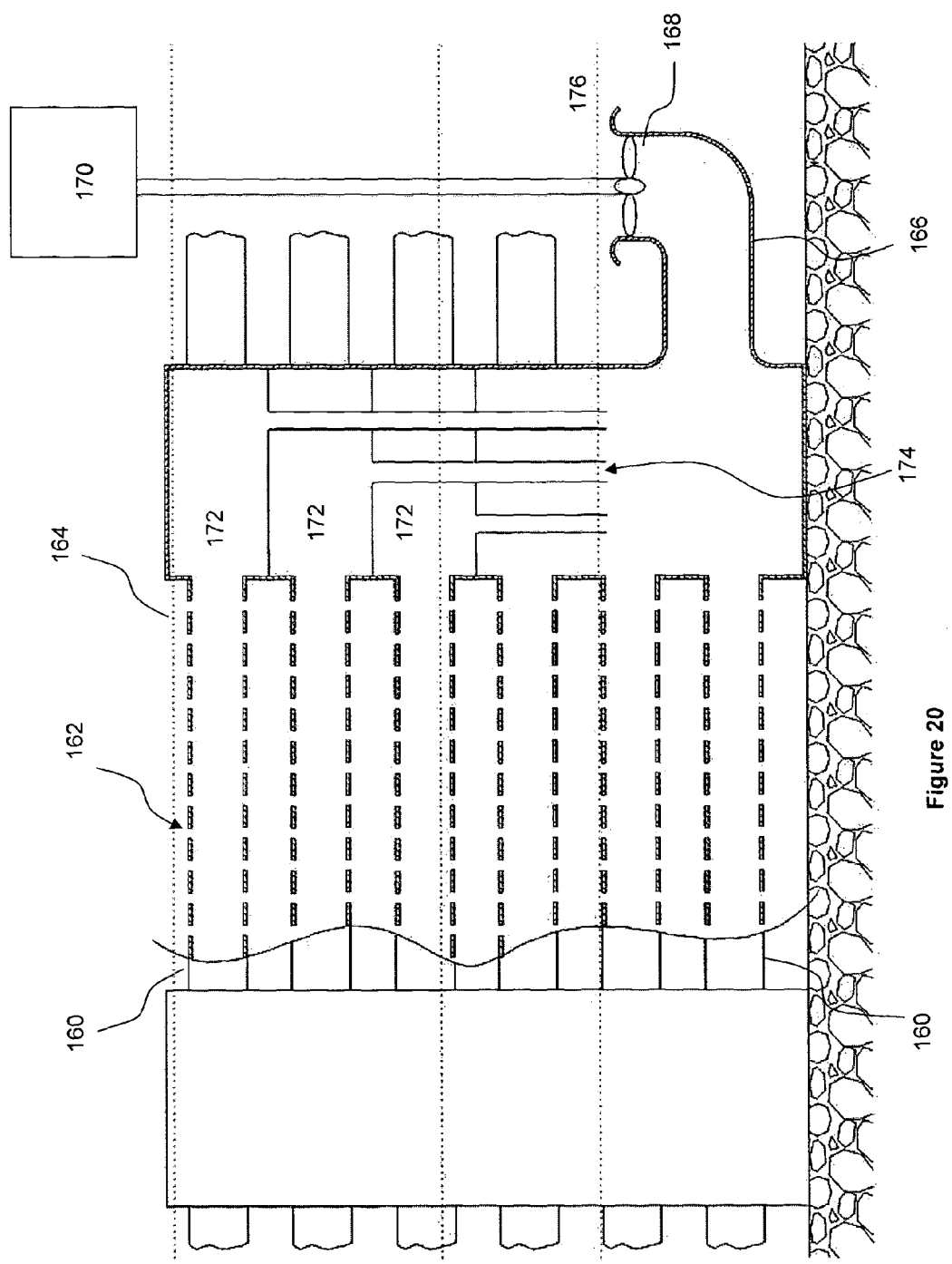
FIG. 20 shows a schematic of an embodiment of the invention having horizontally arranged pipes.

In another embodiment of the invention when the apparatus comprises horizontal pipes 160, the vertical manifold 164 can be segmented. FIG. 20 shows a cross section of part of an apparatus having horizontal venturi pipes 160 provided with a series of holes 162 and extending between vertical manifolds 164. The manifold 164 is connected to a flow conduit 166 housing a turbine 168 connected to a drive shaft to drive a generator 170. The vertical manifold pipe 164 is divided into a plurality of chambers 172 arranged vertically along the length of at least part of the manifold. A tube 174 is connected to each chamber and extends from the chamber to below the minimum free surface level 176 that the free surface of the secondary flow water will reach. Each chamber 172 is positioned to correspond with a horizontal pipe 160 extending from the vertical manifold 164. The number of chambers required will depend on the variation in water level that the pipes are exposed to. It is not necessary that all venturi pipes are associated with an individual chamber.

Figure 21:
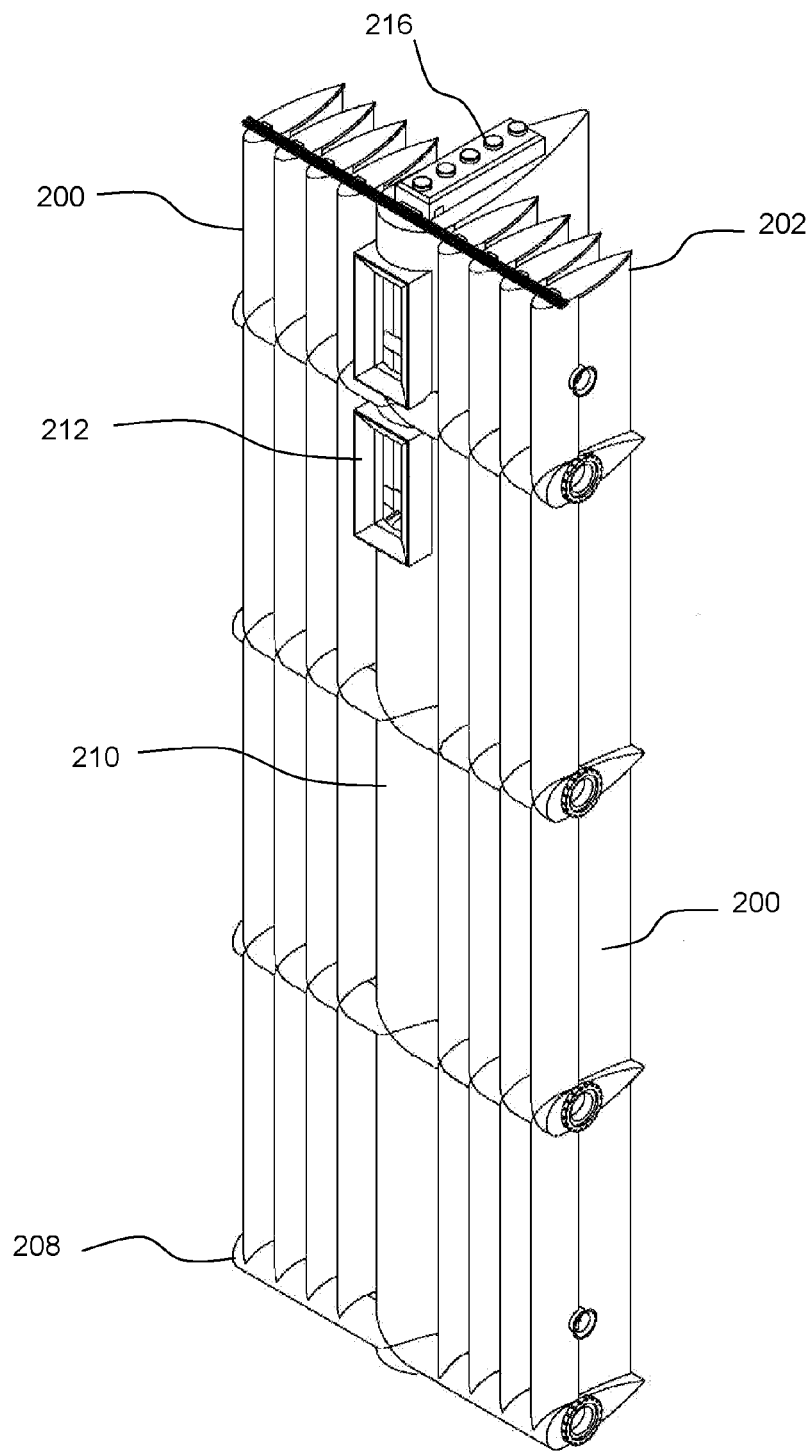
FIG. 21 shows a schematic view of one embodiment of the invention having vertical pipes.
Figure 22:
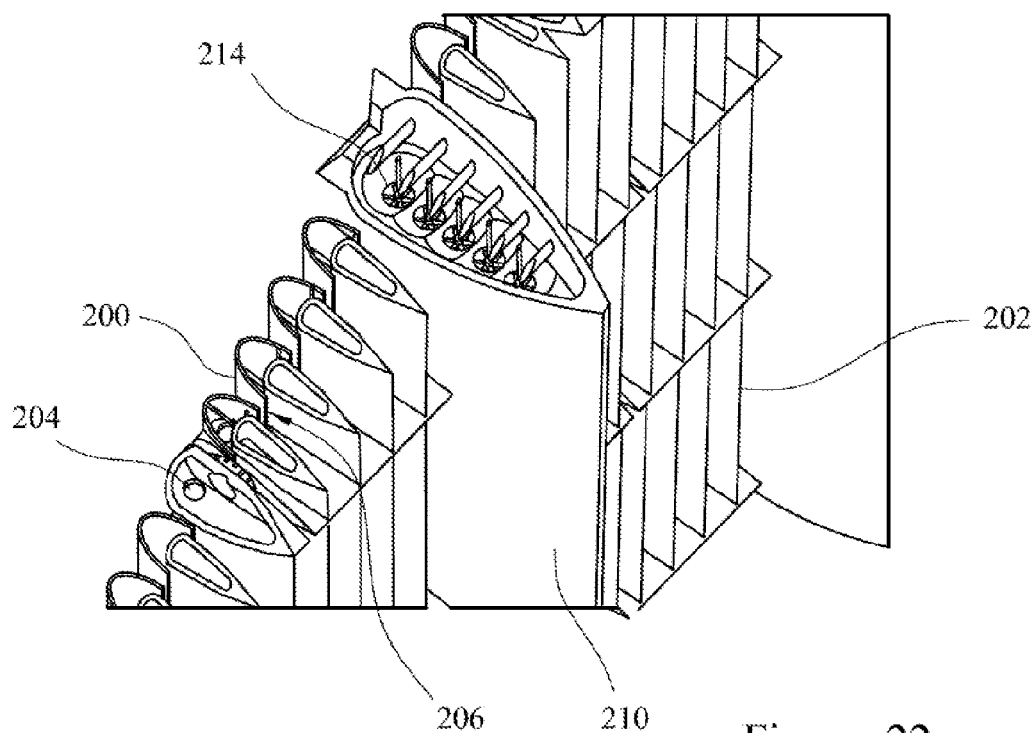
FIG. 22 shows a cut away view of the embodiment of FIG. 21.
Figure 23:
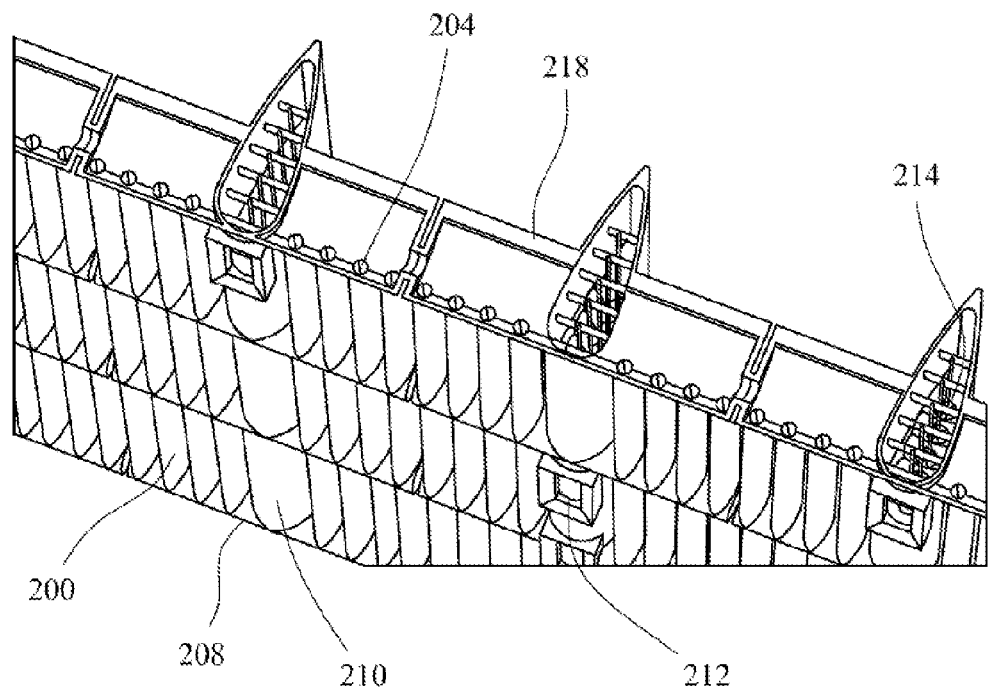
FIG. 23 shows another cut away view of the embodiment of FIG. 21.

FIGS. 21, 22, and 23 show a further embodiment of the SMEC apparatus. In which the apparatus comprises an array of vertical pipes 200 have a tapered downstream side 202 and a flow passage 204 having holes 206 positioned along its length. The pipes 200 are connected to a common horizontal manifold 208 which in turn is connected to a vertical flow conduit 210. The flow conduit 210 has inlets 212 for receiving water from the body of water and one or more turbines 214 located within the flow conduit 210 connected to a generator 216 via a drive shaft. Horizontal manifolds 218 are positioned across the pipes 200 and flow conduit 210.

Figure 24:
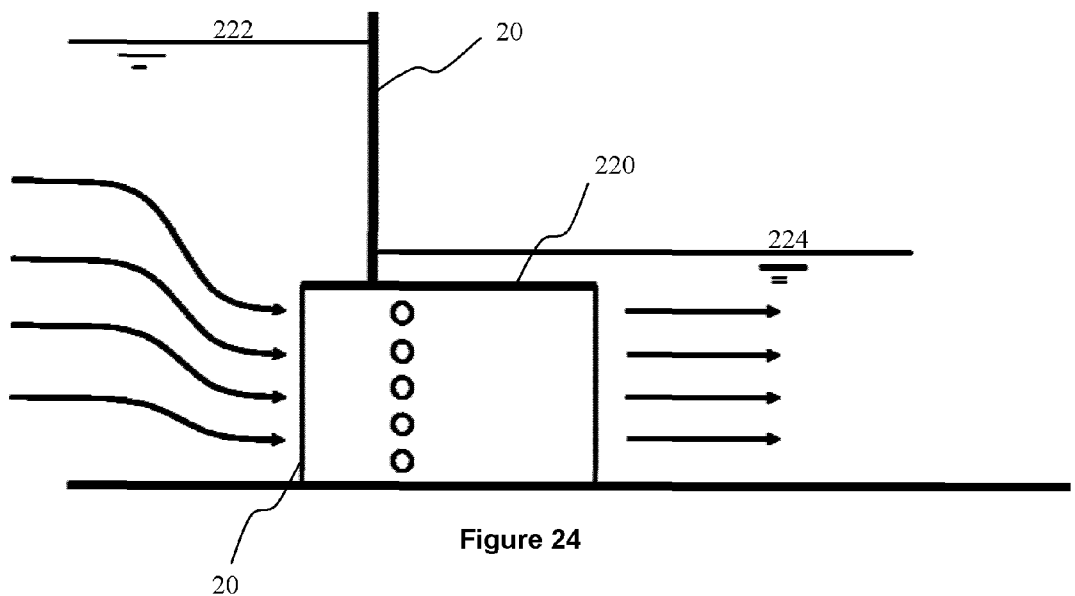
FIG. 24 shows a side view of an embodiment of the invention.

FIG. 24 shows one embodiment of the SMEC apparatus. The apparatus comprises a series of vertical pipes 20. The vertical pipes 20 are closed off at their top end with a substantially horizontal barrier 220 extending across the top of the apparatus. In use, the horizontal barrier 220 lies below the upstream water level 222 and the top of the pipes 20 lie below the downstream water level 224. The vertical length of the pipes is chosen during the design of the apparatus to suit the flow conditions at a particular site. A substantially vertical barrier 226 extends upwards from the horizontal barrier 220. The vertical barrier 226 is impervious to water and retains the upstream water level above the top of the pipes.

Figure 25:
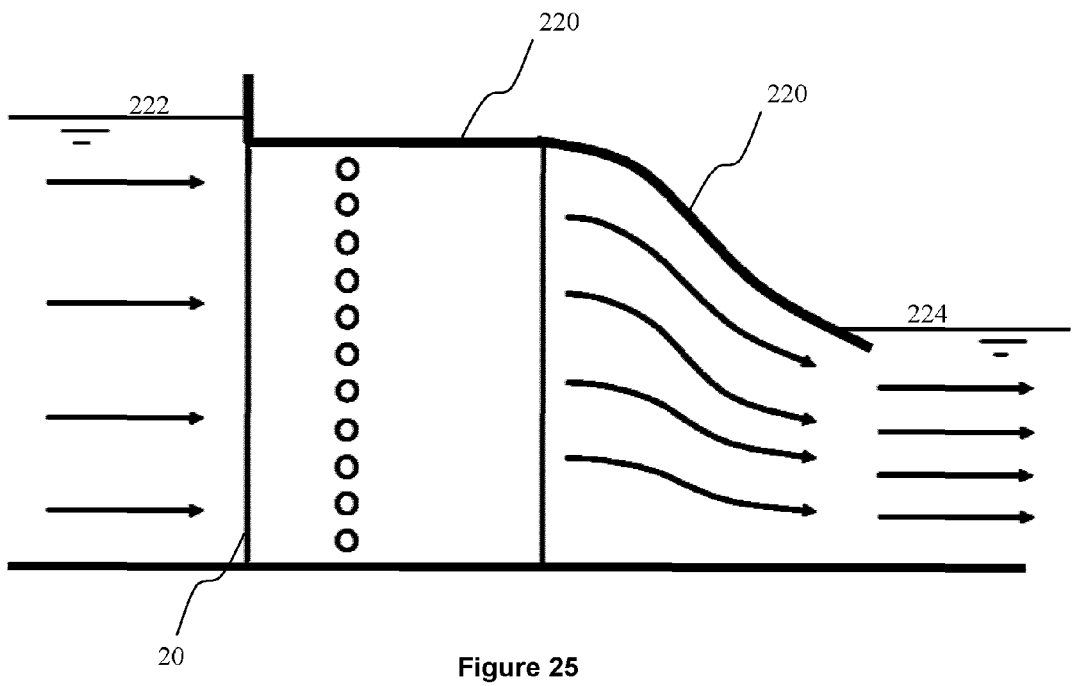
FIG. 25 shows a side view of an embodiment of the invention comprising a symphonic cowl.

FIG. 25 shows an embodiment of the SMEC apparatus. The apparatus comprises a series of vertical pipes 20. The vertical pipes are closed off at their top end with a barrier 220 extending across the top of the apparatus. In use the barrier 220 lies lower than the upstream water level 222. A substantially vertical barrier 226 extends upwards from the horizontal barrier 220. The vertical barrier is impervious to water and retains the upstream water level 222 above the top of the pipes. A symphonic cowl 228 is attached to the downstream end of the apparatus. The water flowing between the upper part of the vertical pipes 20 exits from between the pipes 20 at an elevation above the height of the downstream water level 224. The syphonic cowl 228 isolates the water inside the cowl from atmospheric pressure such that the hydrostatic pressure in the water in the cowl can fall below atmospheric pressure and thereby permitting a uniform pressure gradient through the water column beneath the cowl and facilitating improved flow conditioning.

The method of installing the SMEC apparatus can vary depending on the type of apparatus and where the apparatus is to be installed. Methods can include floating the sections of the apparatus into position, lowering the apparatus into position by controlled flood and/or lowering the apparatus into position by cranes or other lifting apparatuses. The SMEC apparatus can be installed to span an entire body of water, i.e., from bank to bank of a river or strait, or may be installed only partially across a body of water.

Locks can be incorporated into the SMEC apparatus as for conventional barrages to permit the passage of shipping. Gaps may be incorporated into the SMEC apparatus to permit the passage of water crafts, fish or marine mammals up and down the river.

Where the apparatus is placed in a flow with a larger cross section than the apparatus the presence of free edges permits the primary flow to divert around the apparatus rather than passing through the pipes. The longer the apparatus relative to the body of water the less the losses are as a percentage of the useful potentially available output energy.

Figure 26:
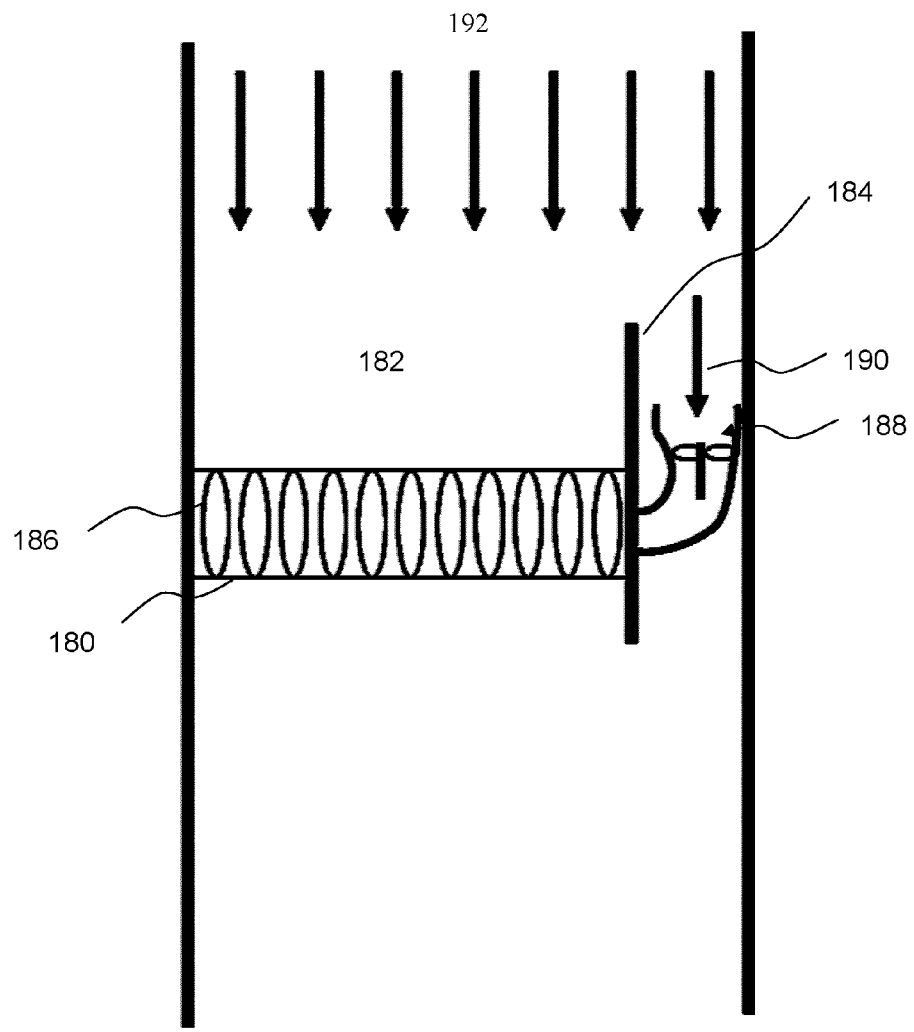
FIG. 26 shows a schematic of an embodiment of the invention installed across part of the width of a body of water.
Figure 27:
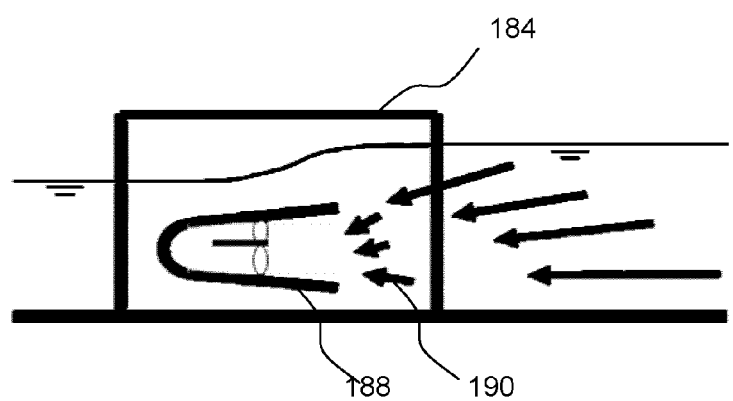
FIG. 27 shows a side view of FIG. 24.

In order to reduce the effect of edge losses the apparatus can run across the entire body of moving water, such as from bank to bank of a river or from one coast to another coast. As shown in FIG. 26 and FIG. 27 where the apparatus 180 does not intercept the entire body of water 182 edge losses can be minimized. In order to minimize edge losses in such an arrangement, a surface 184 can be attached to the free end of the apparatus extending at right angles upstream of the apparatus 180. The surface 184 can help direct water through the pipes 186 and minimize flow around the edge. The inlet 188 for the secondary flow 190 can be located at the free edges to encourage the primary flow 192 to pass between the pipes 186 rather than around the free edges.

Figure 28:
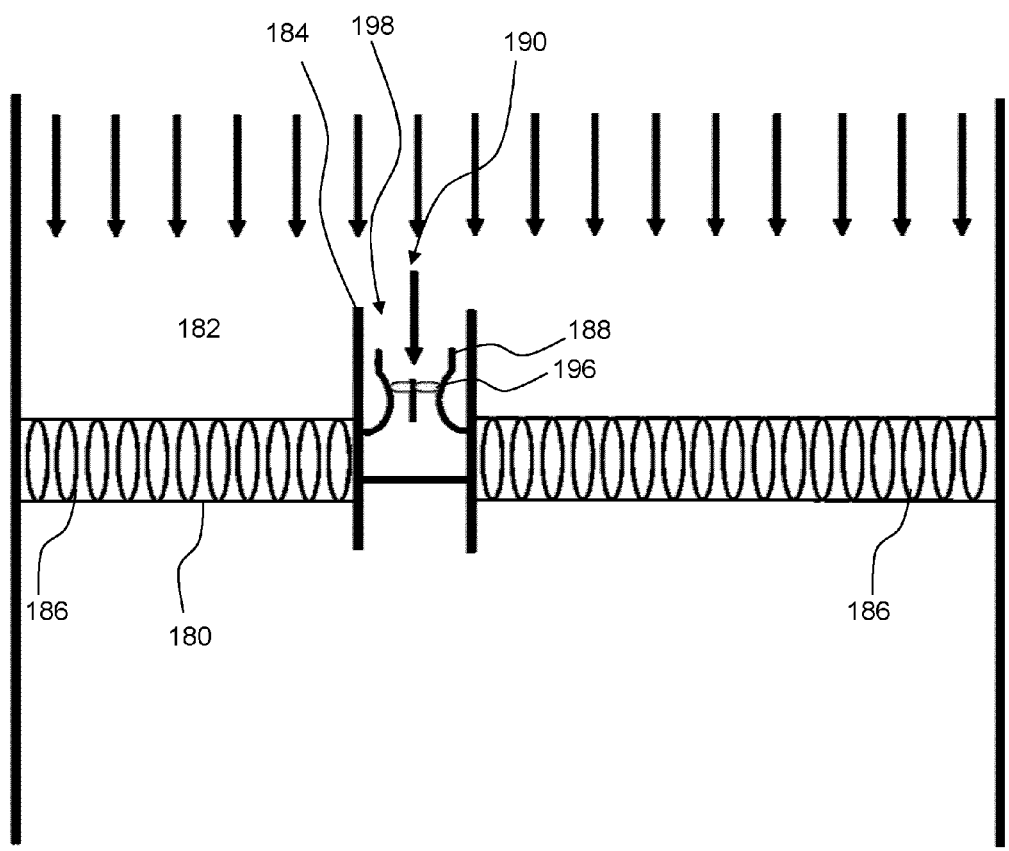
FIG. 28 shows a schematic of an embodiment of the invention having a gap installed across a body of water.

In FIG. 28 the apparatus 180 is installed substantially across the full width of the water 182, with a gap 198 part-way across in which an inlet comprising a turbine 196 is located. A surface 184 is attached to each of the free ends of the modules on either side of the gap 198 to help inhibit by pass flow, while still maintaining an open passage in the structure. Secondary flow 190 through the turbine accommodates head drop across the apparatus.

In one embodiment each of the SMEC apparatus can be formed as modules and positioned long the length of the river or other body of water, such as an estuary, fjord, channel. The modules can use the current or tidal flow of the water to generate electricity.

Figure 29:
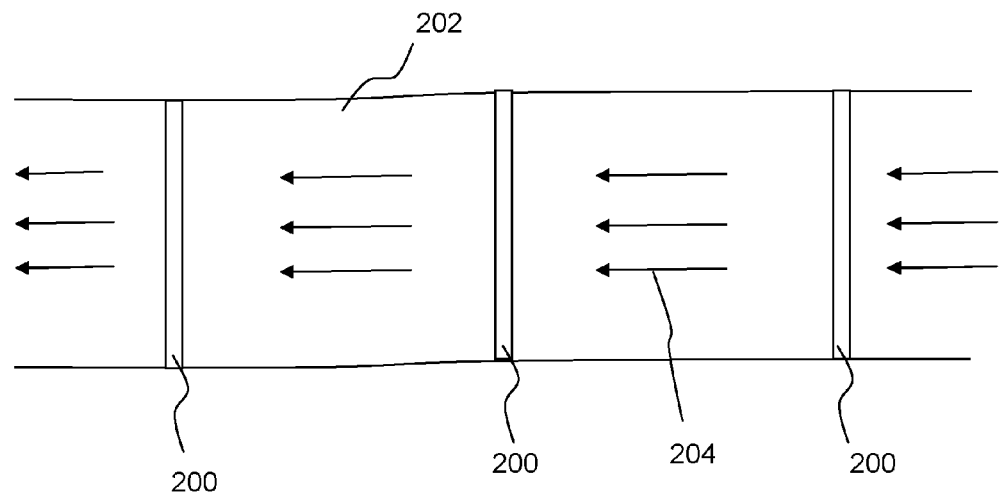
FIG. 29 shows a bird's eye view of structures installed along the length of a body of water.

As shown in FIG. 29 a series of structures 200 formed from the modules are installed along the length of the river 202 or other body of water. Each structure 200 is positioned across the width of the river perpendicular to the direction of the flow 204 of water and upstream and/or downstream of a further module.

Figure 30:
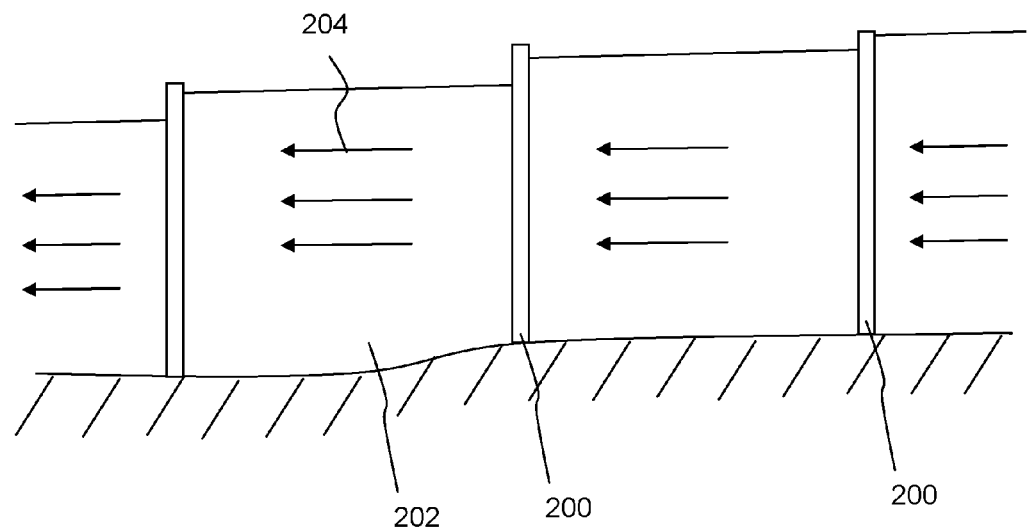
FIG. 30 shows a side view of structures installed along the length of a body of water

FIG. 30 shows a general view of the apparatus in operation, with three structures 200 positioned along the length of the river 202. Further structures can be installed as required. The structure forms an obstruction to the water as it flows down the river and a light increase in river level will occur behind the SMEC. This increase in the river depth is the low head driver of the apparatus. As the free board elevation formed behind each structure is minimal compared to complete damming of the river, the upstream environmental impact is less damaging.

The distance the structures are spaced apart will play a part in determining the ultimate increase in river level upstream of the array of structures. The distance between each structure will depend on the environment in which it is installed. The distance between the structures can vary depending on the contours of the land the rivers flow over. The distance between each structure can be sufficient such that the flow level of the river where an upstream structure is to be positioned is substantially unaffected by any downstream SMEC. If the structures are spaced sufficiently apart the river level upstream of the structures will reach its original level, despite the localized increase in head immediately behind each structure.

The heights of the pipes are selected to suit the depth of the river where the structure is to be installed. The length of the pipes will be of a length such that the modules will extend down to the river bed to minimize by-pass flow.

Figure 31:
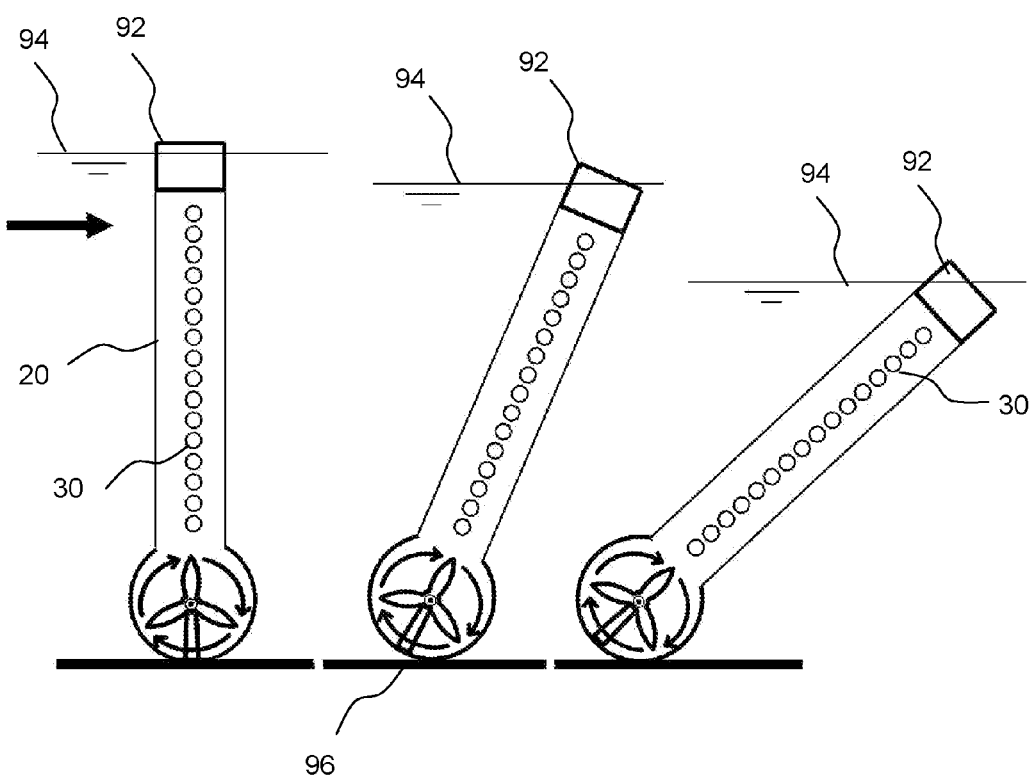
FIG. 31 shows a side view of pipes at different water levels.

The modules can be installed to be moveable within the body of water. As shown in FIG. 31 the modules can comprise a buoyancy section 92 or external float, which keeps the top of the pipe 20 at the water surface level 94. As the water level 94 falls the SMEC can roll on the river bed 96 such that the holes 30 of the pipes 20 and the module will stay substantially submerged as the water level rises and falls.

Once a first structure has been positioned in the river, further structures can be positioned across the river upstream and/or downstream of the first structure. The number of structures that are installed will depend on the environment and the amount of electricity that is required to be generated. This embodiment is particularly applicable for inland river systems, when coastal currents and tidal forces are not available to harness the energy from. The SMEC modules do not rely on the tidal height range, and rely on the volumetric inflow and outflow. This makes the SMEC particularly suitable in bodies of water where there is a large volume water which is not necessarily flowing at high velocity, for example rivers having significant depth or width.

Frictional losses occurring through the secondary flow path can cause a fall in pressure at a number of points throughout the flow path resulting in a decrease in maximum output that can be obtained. Frictional losses can occur through the intake to the turbines as the water enters the turbine. These losses can be minimized by using a smoothly contoured entry duct.

The hydrodynamic efficiency of the power offtake turbines can affect the overall performance of the apparatus. The use of controllable-pitch turbines can help maximize performance. Turbine types suitable for SMEC include Axial flow and Kaplan turbine types. Frictional losses can all be minimized by reducing sharp edges and employing smooth internal surface of the parts of the turbine in contact with the water. The turbine can be positioned low in the water, this increases the ambient operating pressure and helps suppress and performance degradation from cavitation over the blade surfaces. Positioning the generator above the water surfaces reduces the chance of water coming into contact with any electrical machinery. This can be achieved with a sufficiently long drive shaft between the turbine and the generator.

The exhaust from the turbine can be subjected to flow conditioning. This can be achieved by locating an outwardly tapered draught tube downstream of the turbine forming a diffuser. This will help sustain a reduced pressure drop downstream of the turbine which increases the power that can be extracted from the secondary flow.

For an apparatus with vertical pipes extending from the horizontal manifold, the volumetric flow rate reduces as water flows up into each subsequent venturi pipe. Therefore in one embodiment of the invention the cross section area of the manifold can be decreased along the flow path to give a constant flow velocity along the length of the manifold at a value above the critical value for sediment deposition. Such flow condition can also help prevent energy wasting eddies forming in the manifold.

In a further embodiment the turbine and generator can be designed to run in reverse as a pump to back flush any debris or contamination out of the apparatus. Conventional antifouling treatment and mechanical cleaning tools can also be incorporated into the apparatus to minimize the effect that marine fouling and sedimentation can have on the performance of the apparatus.

Variations can be made to the invention. The aspect ratio of the profile of the pipes can be varied to provide the optimum performance of the array. The aspect ratio of the profile of the pipe is ratio of the length of L of the profile and of the width W of the profile at its widest point.

Further changes can be made within the scope of the invention.

The invention claimed is:

1. An apparatus for generating electricity using water flow in a body of water comprising:
    an array of spaced apart elements, each element defining an elongate flow passage and having an upstream side and an elongate downstream side, each element being provided with a series of holes spaced along at least part of its length and the elongate downstream side extending and tapering away from the upstream side, wherein the elements are arranged side by side such that opposing walls of adjacent elements define a venturi section and a first diffuser section extending downstream from the venturi section;
    a flow conduit having an inlet and an outlet;
    a turbine located in the flow conduit;
    a generator or hydraulic pump connected to the turbine; and
    wherein the elongate flow passages are connected to the outlet of the flow conduit such that the water flow through the venturi sections causes water to be drawn through the flow conduit and out via the series of holes with the resulting water flow driving the turbine.

2. An apparatus according to claim 1 wherein the upstream side of each element extends and tapers away from the series of holes to form an elongate shape such that when the elements are arranged side by side in an array, opposing walls of adjacent elements define a second diffuser section extending upstream from the venturi section.

3. An apparatus according to claim 2 wherein a profile of the upstream side and a profile of the downstream side are substantially the same.

4. An apparatus according to claim 1 wherein a profile of a front end of the upstream side is substantially V-shaped.

5. An apparatus according to claim 1 wherein a profile of each element is substantially hexagonal.

6. An apparatus according to claim 1 wherein a profile of each element is substantially elliptical.

7. An apparatus according to claim 1 wherein a profile of the upstream side and the profile of the downstream side are substantially different.

8. An apparatus according to claim 1 wherein an outer surface of each element defining the first diffuser section is roughened to induce turbulence flow through the first diffuser section.

9. An apparatus according to claim 1 further comprising a spacer element located within the first diffuser section.

10. An apparatus according to claim 9 wherein the spacer element is moveable within the first diffuser section relative to the spacer element.

11. An apparatus according to claim 1 wherein an end of the downstream side of each element comprises a plurality of orifices.

12. An apparatus according to claim 1 wherein the downstream side comprises a flow control valve, the flow control valve providing a flow path between the downstream side and the elongate flow passage.

13. An apparatus according to claim I wherein each element comprises a moveable separation panel to separate the upstream side from the downstream side.

14. An apparatus according to claim 1 wherein the downstream side includes a buoyancy section.

15. An apparatus according to claim 1 wherein the elements are arranged substantially vertically.

16. An apparatus according to claim 1 wherein each element is connected to a horizontal manifold at its lower end; the horizontal manifold being connected to the flow conduit.

17. An apparatus according to claim 1 further comprising horizontal flow management vanes arranged horizontally across the elements.

18. An apparatus according to claim 1 wherein each elongate flow passage comprises a series of chambers positioned vertically down the elongate flow passage; and a feeder tube extending from each chamber and having an inlet located below the series of chambers.

19. An apparatus according to claim 1 further comprising at least one horizontal septum extending between adjacent elements.

20. An apparatus according to claim 1 wherein the elements are arranged substantially horizontally.

21. An apparatus according to claim 1 wherein each element is connected to a vertical manifold; the vertical manifold being connected to the flow conduit.

22. An apparatus as claimed in claim 20 or claim 21 wherein the horizontal manifold and the vertical manifold each comprises a series of chambers, each chamber positioned adjacent an end of a flow passage; and a feeder tube extending from the chamber and having an inlet located below the series of chambers.

23. An apparatus according to claim 1 further comprising at least one vertical septum extending between adjacent elements.

24. An apparatus according to claim 1 further comprising a symphonic cowl extending from the downstream side of the apparatus.

25. An apparatus according to claim 1 wherein the holes comprise a closure mechanism operable between an open position and a closed position such that when the closure mechanism is in the closed position water is prevented from flowing through the holes.

26. An apparatus according to claim 25 wherein each hole has an individually controllable closure mechanism.

27. An apparatus according to claim 25 wherein the closure mechanism is a valve.

28. An apparatus according to claim 25 wherein the closure mechanism is a gate.

29. An element for inclusion in an apparatus according to claim 1 for generating electricity using current or tidal flow in the body of water; the element defining an elongate flow passage and having an upstream side and an elongate downstream side, the element being provided with a series of holes spaced along at least part of its length, the downstream side extending and tapering in a direction of flow, such that when elements are placed side by side in an array, opposing walls of adjacent elements define a venturi section and a diffuser section extending downstream from the venturi section.

30. A method for generating electricity from tidal or current flow comprising providing the apparatus according to claim 1 in a flow of water; permitting a tidal or current flow to flow through the venturi section, and permitting a secondary flow to flow through the flow conduit and drive the turbine.

* * * * *